July 24, 1934.  M. W. TETLOW  1,967,337
METHOD OF SECURING SHOE PARTS TOGETHER
Filed May 29, 1930    2 Sheets-Sheet 1
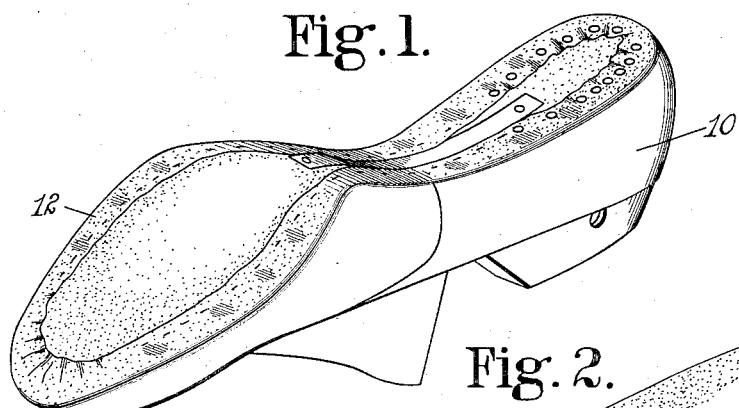
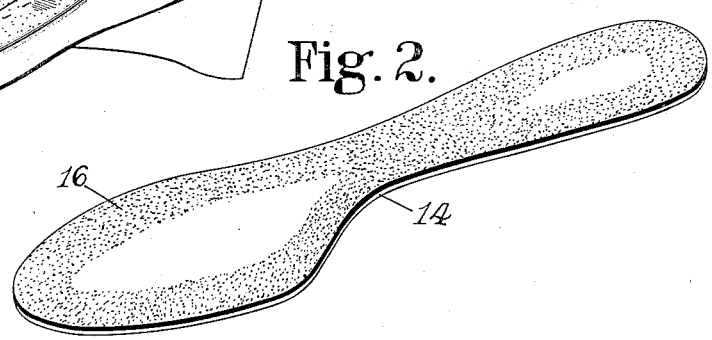
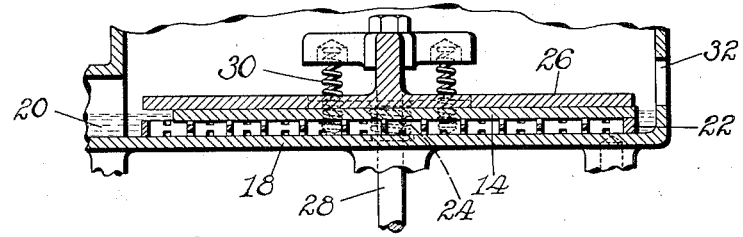
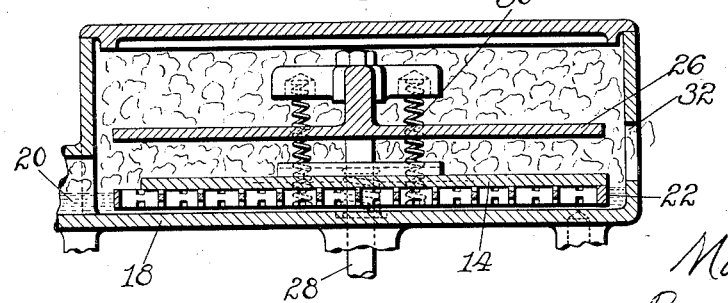

July 24, 1934.   M. W. TETLOW   1,967,337
METHOD OF SECURING SHOE PARTS TOGETHER
Filed May 29, 1930   2 Sheets-Sheet 2

INVENTOR.
Max W. Tetlow
By his Attorney,
Nelson N. Howard

Patented July 24, 1934

1,967,337

UNITED STATES PATENT OFFICE 1,967,337

METHOD OF SECURING SHOE PARTS TOGETHER

Max W. Tetlow, Milton, Mass., assignor to United Shoe Machinery Corporation, Paterson, N. J., a corporation of New Jersey Application May 29, 1930, Serial No. 457,189

8 Claims. (Cl. 12—142)

This invention relates to the manufacture of shoes of the type in which the outsoles are attached by cement.

In the manufacture of shoes of this type it is the usual practice to coat both the attaching surface of the outsole and the bottom of the lasted shoe with cement and thereafter to effect the attachment of the sole to the shoe by positioning the sole upon the shoe and holding it in place under pressure while the cement is setting.

Usually a quick drying adhesive, such, for example, as pyroxylin cement, is employed and for certain reasons it has been found most practical to apply the cement coatings to the sole and the shoe bottom, allow them to dry apart from each other, and then to soften and render the cement tacky with a solvent immediately before the sole is applied to the shoe. Among these reasons is the fact that during the time required for the application of the cement, an operation which has heretofore been performed by hand, that portion of the cement which was first applied to the article has dried considerably by the time the coating of the articles is finished, and it is difficult to secure substantial uniformity of condition throughout the cemented areas of the sole and the shoe bottom at the moment when they are ready to be brought together. Another practical difficulty arises from the tendency of the cement to be squeezed out at the edge of the work when the sole attaching pressure is applied, producing an unclean edge and sometimes imperfect adhesion because insufficient cement remains between the surfaces to be attached.

When, however, the cement coatings are first allowed to dry the cement penetrates the leather more or less, obtaining a very firm hold thereon, and it is only necessary to soften it superficially in order to produce adhesive surfaces which, when pressed together, will immediately coalesce and produce a practically unbreakable bond. This superficial softening or reviving of the cement can be done quickly and its effect need not extend through the entire thickness of the cement coating, with the result that there will be much less tendency for the cement to be squeezed out by the attaching pressure, and cleaner edges and better adhesion will be obtained.

Formerly it was customary to apply the solvent manually with the aid of a brush and, inasmuch as suitable solvents are very volatile, it was the practice for one operator to apply solvent to a sole while another operator was applying solvent to the shoe to which the sole was to be attached, in order that neither article should have time to become too dry before they could be brought together. One of these operators would then position the work in the sole attaching machine, and the production of that machine has been materially restricted by the loss of the time required by that operator for the application of the solvent to one of the parts of the work.

Recently, however, there has been developed an apparatus of which an example is disclosed in copending application Serial No. 396,554, filed October 1, 1929, in the name of C. E. Hood, by the use of which solvent may be applied simultaneously to all parts of the cemented face of an outsole nearly instantaneously, and it is an object of the present invention to provide an improved method of preparing and attaching shoe parts by cement, in the practice of which advantage may be taken of the capabilities of this or other adequate solvent applying apparatus in such a way as not only to make it practicable to dispense with one of the operators mentioned above but to increase the production rate of the sole attaching machine even with a single operator and to obtain cleaner work and a better bond between the parts of the work than have been secured by former methods. In this connection it should be understood that while the Hood apparatus is well adapted for use in carrying out my novel method as applied to the attachment of soles to shoes, the method, as such, is capable of performance with other specific mechanical aids and is independent of any particular form of apparatus.

Viewed in its broader aspects, the invention may be considered to consist in a method of securing together a plurality of articles, at least one of which has a coating of cement, by applying solvent to the cement on the article, keeping the wetted surface of the cement in an atmosphere of vapor of the solvent for a mulling period sufficient to permit the solvent to penetrate the surface of the cement and soften it, then placing together and holding in firm contact the surfaces of the articles until they adhere. In case the surfaces of both pieces of work are cemented but only one of the parts is wetted, enough of the solvent will migrate from it to the drier surface in contact with it to soften the latter sufficiently to effect a perfect union.

Under some conditions it may be found that the best results are secured by including in the method an additional step comprising a second application of solvent after the mulling period in order to provide an excess of the solvent for penetrating and softening the cement coating upon the part to which no solvent has been applied before the parts to be joined have been placed together, and it is within the scope of the invention to include or omit this step as may be preferred in any given instance.

In applying my method to the manufacture of shoes one of the shoe parts to be secured together—one or both of the parts having previously been coated with cement—may have its cemented surface wetted with solvent and mulled in the solvent vapor until softened and properly conditioned for perfect adhesion when the parts are pressed together. When a sole is to be attached to the bottom of a lasted shoe the sole may advantageously be treated in the manner described just prior to its application to the shoe, the mulling of the cement coating of the sole in the solvent vapor effecting a uniform distribution of the solvent in and on the cement and when the softened surfaces upon the sole and shoe coalesce a strong and complete bond between the two is produced.

In order to facilitate a better understanding of the invention an example of the performance of the method will now be described in detail in connection with the accompanying drawings, in which Fig. 1 shows a lasted shoe having its bottom cemented, ready for the reception of an outsole;

Fig. 2 shows the cemented attaching face of the outsole;

Figs. 3, 4 and 5 are sectional views showing a portion of the solvent applying apparatus at successive stages in the conditioning of the sole.

Figure 6:
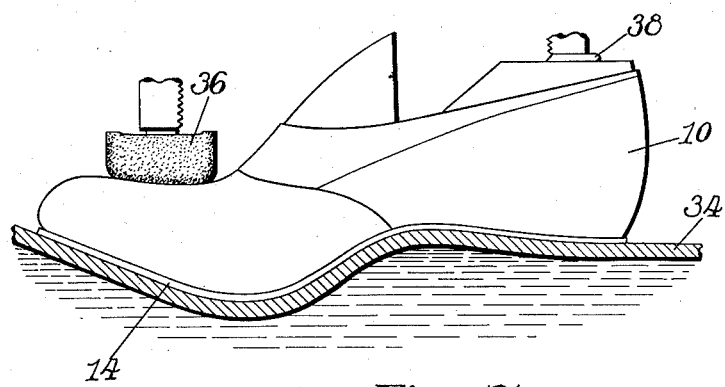
Figs. 6 and 7 are sectional views of a portion of the sole attaching machine at successive stages in its operation.
Figure 7:
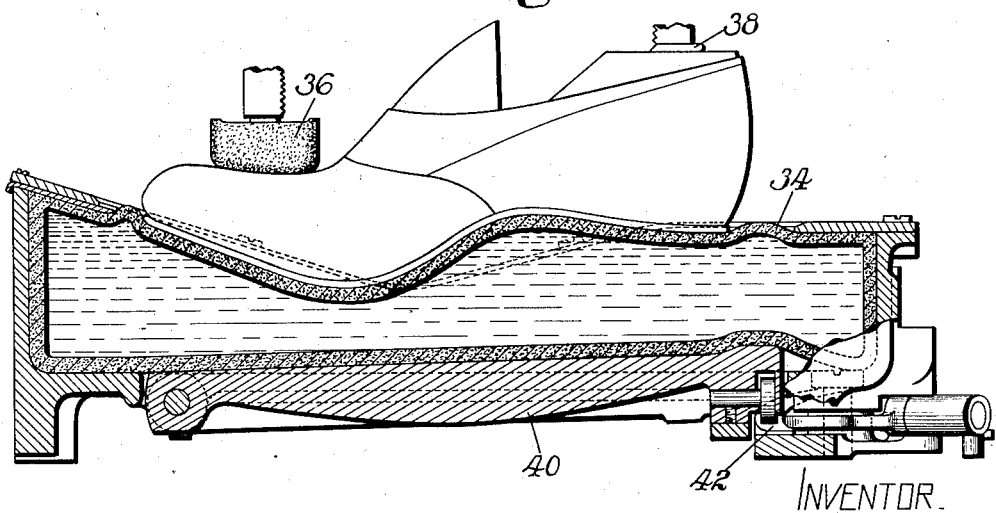

For illustrative purposes it may be assumed that a cemented sole is to be attached to a cemented shoe by a pressure applying machine such as that disclosed in United States Letters Patent No. 1,897,105, granted February 14, 1933, on the application of Milton H. Ballard. Inasmuch as the sole attaching machine itself is no part of the present invention, only a sufficient portion of it is shown in Figs. 6 and 7 of the accompany drawings to illustrate its use in the performance of my improved method.

Referring now to Fig. 1, the numeral 10 indicates a lasted shoe the bottom of which has been prepared for the reception of an outsole by coating the overlasted marginal portion 12 of the shoe upper with cement and allowing it to dry until it is non-tacky. The cement used must be of such a character that it can be revived and made adhesive by the application to it of a solvent, preferably a very volatile solvent which will permit the cement again to dry quickly, by reason of the rapid evaporation of the solvent. Pyroxylin cement is an example of a material which is satisfactory and is much used in this kind of work, although the present invention is not restricted to the use of this particular type of cement.

In Fig. 2 is shown an outsole 14 which has been prepared for attachment to the shoe 10 by applying to its attaching face a coating 16 of cement and allowing the same to dry.

According to the method of my invention the cement coating 16 upon the outsole is revived and made adhesive by applying solvent to it, preferably very quickly and substantially simultaneously to all parts of its surface. This may be conveniently accomplished, for example, by the use of the apparatus disclosed in the above identified Hood application, enough of such apparatus being shown in Figs 3, 4 and 5 of the accompanying drawings to illustrate the manner of its use in the practice of my invention.

Figure 5:
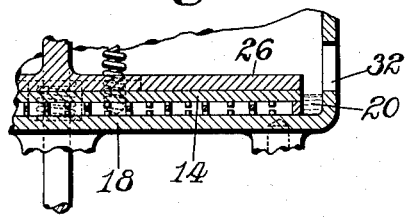

In said Figs. 3, 4 and 5 are shown a substantially closed chamber or receptacle 18 containing solvent 20, which is maintained at a constant level. In the receptacle there are movably mounted a work supporting grid 22 normally supported by springs 24 with its upper face just above the surface of the solvent liquid, and a presser plate 26 mounted upon upright rods 28 and normally held in the elevated position shown in Fig. 4 by springs 30. Depression of the plate 26 may be effected by a treadle (not shown) connected to the rods 28. A narrow opening 32 in the end wall of the receptacle, opposite the space between the grid 14 and the presser plate 26, provides for insertion and withdrawal of the work, without permitting any considerable proportion of the vapor from the solvent to escape.

The solvent applying apparatus being as shown in Fig. 4, the operator may remove a treated sole 14 therefrom and insert a dry cemented sole through the opening 32, depositing it upon the grid 22 cemented face down. He will then depress and immediately release the treadle, causing the parts first to assume the positions shown in Fig. 3 and then to return to the positions shown in Fig. 4. In Fig. 3 the cemented surface is dipped in the solvent 20, which is thus simultaneously applied to the entire cemented area, while in Fig. 4 the wetted surface is raised and supported above the liquid in the atmosphere of solvent vapor which fills the space in the receptacle 18 above the body of solvent liquid therein. This sole is left in this position to drain and mull while the operator places the treated sole which he has just removed from the solvent applying apparatus upon the distortable fluid-containing pad 34 of the cement sole-attaching machine, Fig. 6, with the moist, jelly-like surface of the cement facing upward, and promptly positions a cemented shoe 10 over the sole, immediately moving the clamps 36 and 38 forcibly into engagement with the shoe and last and then applying additional pressure by distorting the pad by means of a pressure applying member 40, operated by a cam 42, all as described in the previously identified Ballard application. This pressure is sufficient to press and hold every part of the sole 14 firmly against the shoe 10. The press unit of the sole-attaching machine, with the work held in it under pressure, is readily removable and is now replaced by another like unit from which the completed work has been removed, whereupon the operator is ready to repeat the sequence of acts described above, the wetted surface of the sole in the solvent applying apparatus having by this time mulled in the solvent vapor for a period sufficient to permit the solvent to penetrate the surface of the cement and soften it to a jelly.

Ordinarily the condition of, and quantity of solvent in, this jelly-like surface will be such that when the shoe and sole are placed together under pressure in the sole-attaching machine enough solvent will migrate from it to the dried cement upon the shoe to soften the latter sufficiently to effect a perfect union between the sole and the shoe. If, however, conditions are such as to require an extra amount of solvent, it is within the scope of the invention for the operator to treadle the solvent applying apparatus a second time just before removing the sole therefrom, thus applying additional solvent to the conditioned surface of the cement, as illustrated in Fig. 5, and providing an excess of the solvent for penetrating and softening the dried coating of cement upon the shoe bottom.

The application of the shoe to the sole can easily be accomplished very quickly after removal of the sole from the solvent applying apparatus and, inasmuch as the treated surface upon the sole has no opportunity to begin to dry out up to the instant of such removal, it becomes feasible to use a more highly volatile solvent than it has heretofore been practicable to use, with a consequent quicker drying of the work in the sole attaching machine press unit. The result of this is that a smaller number of press units is required for a given production, and the necessary investment in machinery is materially reduced.

Having described the invention, what is claimed as new and desired to be secured by Letters Patent is:

1. The method of securing together a plurality of articles, at least one of which has a coating of cement, which consists in applying liquid solvent to the cement on only one surface of said article, keeping the wetted surface of the cement in an atmosphere of vapor of the solvent for a mulling period sufficient to permit the solvent to penetrate and uniformly soften the surface of the cement, placing the coated surfaces of the articles together and holding them in firm contact until they adhere.

2. The method of securing together a plurality of shoe parts, each of which has a surface provided with a dried coating of cement, which consists in applying a liquid solvent to the cement on one of said parts, keeping the wetted surface of the cement in an atmosphere of vapor of the solvent for a mulling period sufficient to permit the solvent to penetrate and soften the surface of the cement, placing the softened cemented surface against the dry cemented surface of another of said parts, and holding said surfaces in firm contact until solvent migrates from the softened surface to the dry surface and the cement coatings coalesce.

3. The method of attaching a cemented sole to a shoe bottom, which consists in wetting the cement upon only one face of the sole with an excess of liquid solvent, allowing the excess solvent to drain while keeping the wetted surface of the cement in an atmosphere of vapor of the solvent for a mulling period sufficient to insure uniform distribution of the solvent throughout the cemented area, removing the sole from the solvent vapor, quickly placing its cemented face in close contact with the shoe bottom, and holding the shoe and sole together under pressure until they are permanently united.

4. The method of attaching a sole having a dried coating of cement to a shoe bottom having a dried coating of cement, which consists in wetting the cement coating upon the sole with a solvent, keeping the wetted surface of the cement in an atmosphere of vapor of the solvent for a mulling period sufficient to permit the solvent to penetrate and soften the surface of the cement, wetting the softened surface a second time with the solvent, placing the softened and wetted surface in close contact with the dry cement upon the shoe bottom, and holding the shoe and sole together under pressure until they are permanently united.

5. The method of attaching a sole having a cemented attaching face to a cemented shoe bottom, which consists in applying a liquid solvent within a substantially closed chamber simultaneously to all parts of the cemented area on one face of the sole, while avoiding the application of solvent to the other face, keeping the sole in an atmosphere of vapor of the solvent in the same chamber for a mulling period sufficient to insure uniform distribution of the solvent throughout the cemented area, then quickly placing the cemented surfaces of the shoe and sole together, and holding them together under pressure until they are permanently united.

6. The method of attaching a sole to a shoe bottom which consists in applying cement to one surface of the sole, applying cement to the shoe bottom, applying liquid solvent to the cement upon the sole, keeping the wetted surface of the cement on the sole in an atmosphere of the vapor of solvent for a mulling period sufficient to insure a uniform distribution of the solvent throughout the cemented area, placing the coated surfaces of the articles together, and holding them in firm contact until they are adhered.

7. The method of attaching a sole to a shoe bottom which consists in applying cement to the marginal portion of one surface of the sole, applying cement to the shoe bottom, allowing the cement coatings to dry, applying liquid solvent to the cement upon the sole, keeping the wetted surface of the cement on the sole in an atmosphere of the vapor of solvent for a mulling period sufficient to insure a uniform distribution of the solvent throughout the cemented area, placing the coated surfaces of the articles together, and holding them in firm contact until they are adhered.

8. The method of attaching a sole to a shoe bottom which consists in applying cement to one surface of the sole, applying cement to the shoe bottom, allowing the cement coatings to dry, dipping the cemented surface of the sole in a body of solvent to a depth less than the thickness of said sole, the sole surface immersed being maintained substantially parallel to the surface of the solvent, keeping the wetted surface of the cement on the sole in an atmosphere of the vapor of solvent for a mulling period sufficient to insure a uniform distribution of the solvent throughout the cemented area, placing the coated surfaces of the articles together, and holding them in firm contact until they are adhered.

MAX W. TETLOW.